(12) United States Patent
Fuxman et al.

(10) Patent No.: US 10,614,702 B2
(45) Date of Patent: Apr. 7, 2020

(54) ALARM TUNING USING ALARM AND PROCESS DATA FOR CONDITION MONITORING

(71) Applicant: HONEYWELL INTERNATIONAL INC., Morris Plains, NJ (US)

(72) Inventors: Adrian Matias Fuxman, North Vancouver (CA); Greg Stewart, North Vancouver (CA)

(73) Assignee: Honeywell International Inc., Morris Plains, NJ (US)

( * ) Notice: Subject to any disclaimer, the term of this patent is extended or adjusted under 35 U.S.C. 154(b) by 111 days.

(21) Appl. No.: 16/014,782

(22) Filed: Jun. 21, 2018

(65) Prior Publication Data

US 2019/0392703 A1    Dec. 26, 2019

(51) Int. Cl.
*G08B 29/22*    (2006.01)
*G06T 11/20*    (2006.01)
*G06F 3/0484*    (2013.01)

(52) U.S. Cl.
CPC ............ *G08B 29/22* (2013.01); *G06T 11/206* (2013.01); *G06F 3/04847* (2013.01)

(58) Field of Classification Search
CPC .... G08B 29/22; G06T 11/206; G06F 3/04847
See application file for complete search history.

(56) References Cited

U.S. PATENT DOCUMENTS 6,975,963 B2* 12/2005 Hamilton ............ G06F 11/3409
                                                        702/180
7,027,959 B2    4/2006 Hayzen et al.
7,289,935 B1* 10/2007 Hugo ................... G05B 23/024
                                                        340/506
2014/0336984 A1    11/2014 Starr

OTHER PUBLICATIONS

Yue Cheng, et al., "Pattern matching of alarm flood sequences by a modified Smith-Waterman algorithm", Chemical Engineering Research and Design, vol. 91, 2013, pp. 1085-1094, journal homepage: www.elsevier.com/locate/cherd.
Iman Izadi, et al., "A Framework for Optimal Design of Alarm Systems", 7th IFAC Symposium on Fault Detection, Supervision and Safety of Technical Processes, Barcelona, Spain, Jun. 30-Jul. 3, 2009, pp. 651-656.

* cited by examiner

*Primary Examiner* — Ke Xiao
*Assistant Examiner* — Jed-Justin Imperial

(57) ABSTRACT

A method of tuning alarm parameters for condition monitoring of processing equipment in an industrial processing facility (IPF). For a selected process variable a first histogram is displayed from stored historical process data. An initial process alarm threshold is overlayed on the first histogram, and ON-time delay alarms are computed using an initial zero ON-time delay that would have occurred. A second histogram displays a distribution of alarms run length from alarm event data with the zero ON-time delay. Alarm tuning adjusts the initial process alarm threshold and/or the initial time delay, and an alarm performance is then evaluated from viewing the first and second histogram or viewing a hybrid display providing a time series plot including alarm event and process data, and the adjusting is repeated until the evaluating is deemed satisfactory. The new alarm tuning values are implemented to a control system of the IPF.

20 Claims, 6 Drawing Sheets

ALARM TUNING USING ALARM AND PROCESS DATA FOR CONDITION MONITORING

FIELD

Disclosed embodiments relate to condition monitoring for industrial process control.

BACKGROUND

Condition monitoring is used for detecting anomalies for machinery or industrial processes to avoid economic losses, such as due to machine failures which can cause accidents, injuries and/or environmental consequences. Condition monitoring is known for generating alerts in the form of alarms (e.g., blinking lights) responsive to the detection of a fault or disturbance in an industrial processing facility (IPF), sometime referred to as a plant, to alert an operator generally working in a control room something urgent or abnormal is currently happening before a critical event (e.g., a machine failure) occurs. An abnormal situation is any unexpected event or situation that confronts the operator during the course of his/her duties that causes the plant operation to be upset or disturbed to a point of concern. A conventional plant control system cannot generally address a disturbance or it may fail to do so, in which case operator intervention to take corrective action is then needed. Alerts should be set to provide sufficient time to allow an operator to take the corrective action, and the number of alarms should not be too low referred to as being 'silent', or be too high referred to as being 'chattering' (or 'fleeting').

Condition monitoring is usually implemented via an algorithm applied in real-time that compares one or more variables comprising real-time sensor values (generally an actual process variable) to a low and/or a high threshold value warning limits. Most condition monitoring technologies and products for heuristic rules (e.g., rules by engineering insight or by trial and error) or data-driven rules require some user tuning of the alarm rules, being at least one of upper and lower threshold warning limits, that when crossed for a minimum period of time (to prevent chattering) generate automatic alerts.

For example, if a furnace process temperature $T_1$ is above 500° C. (a high threshold process limit) for a duration of more than 4 minutes, then an alarm may be raised to an operator. Accordingly, there are at least 2 alarm tuning parameters that need to be set, comprising a threshold limit(s), and at least one time delay (also called alarm delay) that generally includes an "ON-delay" which waits for the threshold limit to be exceeded for an on-delay time before switching the alarm state to "ON", and one "off-delay" which waits for the threshold limit to be not exceeded for an off-delay time before switching the alarm state from ON back to "OFF". There are generally always both of these delays. Thus the ON-delay time governs the change from OFF to ON of an alarm state, and the OFF-delay time governs the change from ON to OFF of the alarm state.

Conventional alarm tuning techniques usually involve taking a single data 'silo' that comprises a single isolated set of data of historical alarm data and analyzing it. Alarm data is a set of text messages generated by the distributed control system (DCS) and stored in alarm log. When a process value (abbreviated PV) exceeds one of its predetermined thresholds, an alarm message is generated. Usually an alarm message contains several fields of information: time stamp, namely, the time instant when the message is generated, tag name, tag identifier, e.g., 'PVHI', 'PVLO', 'OFFNORM', and some other information such as the priority, the value of the process variable, the trip point and so on. The tag name plus tag identifier reflects what type of alarm occurs, and the time stamp reflects the time when the alarm occurs. Two silos of data refers to two data sets that are typically not saved together or otherwise integrated with each other.

In some more advanced alarm tuning techniques this may involve creating a histogram of a function of this data (e.g. duration of the alerts, or the time between alerts), and then increasing the alarm delay time (either the ON-delay time, OFF-delay time, or both the ON- and OFF-delay times) setting in order to reduce the amount of chattering alarms. It is understood this advanced alarm tuning method comes with the cost of slowing the operator alarm response time for real alarm-worthy events. For example, if this activity is the performance of a process variable over a year's worth of data for a chattering alarm, there can easily be several thousand alarm events in that database.

SUMMARY

This Summary is provided to introduce a brief selection of disclosed concepts in a simplified form that are further described below in the Detailed Description including the drawings provided. This Summary is not intended to limit the claimed subject matter's scope.

The Disclosure recognizes a problem for the above-described known alarm tuning is the required processing of a large amount of data into an understandable form which is not reasonable for a human to perform this data processing, and there is no known computer implementation for this purpose. However, using the new features provided in this Disclosure as described below, a computer can implement the processing of a large amount of data into an understandable form presented as histograms for an individual to utilize to enable tuning alarm alert parameters including an alarm delay time and/or an alarm threshold.

One disclosed embodiment comprises a method of tuning alarm parameters for condition monitoring of processing equipment configured in an IPF to run an industrial process or for monitoring of the industrial process itself. Initializing comprises for a selected PV, generating and then displaying a first histogram of values over a time period from stored historical process data. The initial process alarm threshold is overlayed on the first histogram, and using an initial zero ON-time delay alarms are computed that would have occurred over the time period. A second histogram is generated displaying a distribution of a run length of alarms from stored alarm event data with the zero ON-time delay as the initial time delay and the second histogram is displayed over the time period.

Alarm tuning comprises adjusting at least one of the initial process alarm threshold and an initial time delay to provide a new pair of alarm tuning values, evaluating an alarm performance with the new pair of alarm tuning values from viewing the first histogram and the second histogram or viewing a hybrid display comprising a time series plot including the alarm event data and historical process data, and repeating the adjusting when the evaluating is deemed unsatisfactory until the evaluating is deemed satisfactory. The new alarm tuning values are implemented to the industrial process or the processing equipment for condition monitoring by transferring the new alarm tuning values to a control system of the IPF.

BRIEF DESCRIPTION OF THE DRAWINGS

FIG. 5A shows example disclosed hybrid alarm data and process data display when the alarm time delay (shown as the time between alarms) is set to minimum value shown as a 1 minute, while

DETAILED DESCRIPTION

Figure 1:
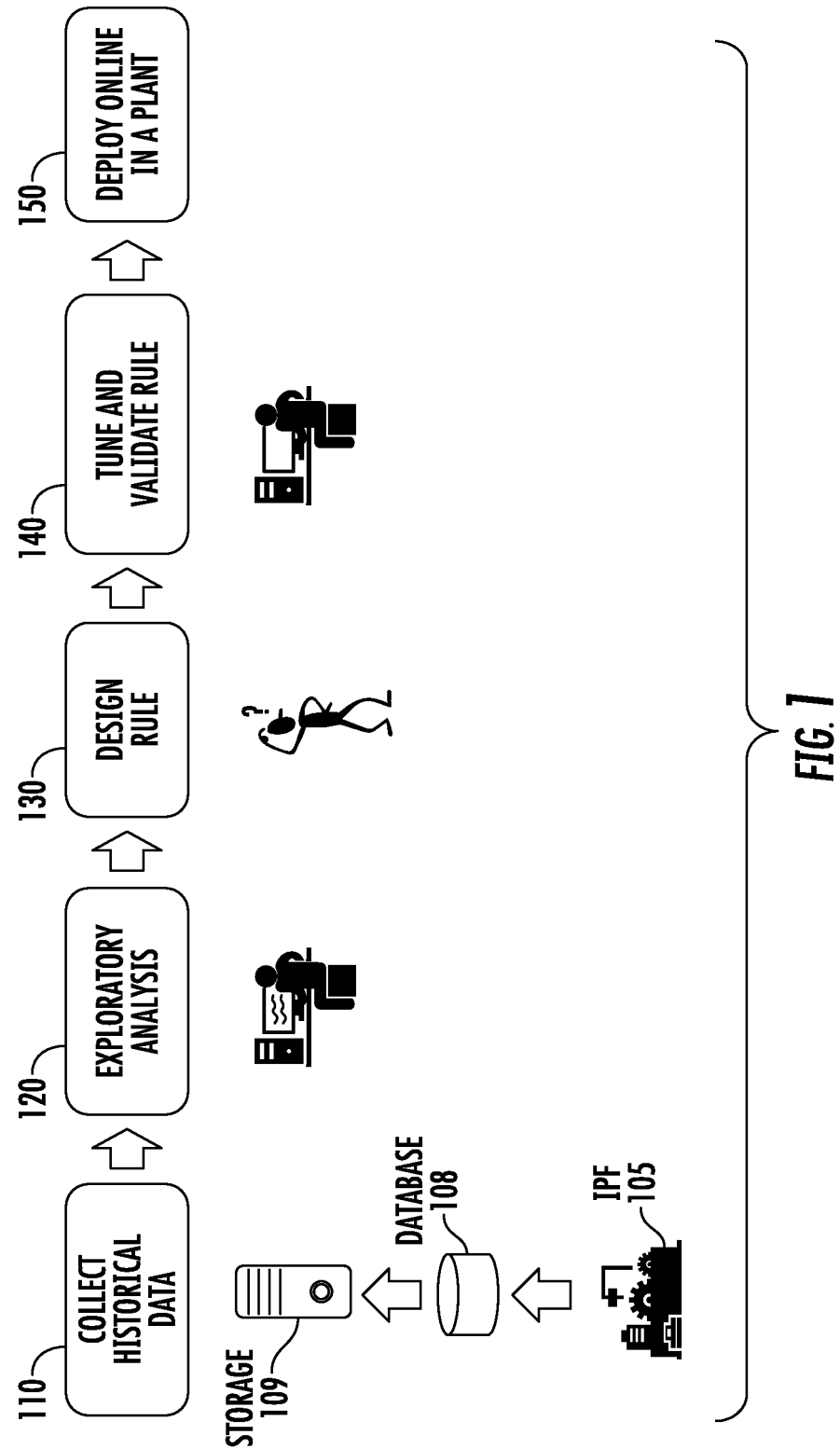
FIG. 1 shows blocks corresponding to steps for implementing condition monitoring for an industrial process run in an IPF, including a disclosed tune and validate rule block.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

As used herein an IPF runs an industrial process involving a tangible material that disclosed embodiments apply. For example, oil and gas, chemical, beverage, pharmaceutical, pulp and paper manufacturing, petroleum processes, electrical, and water. An IPF is distinct from a data processing system which only performs data manipulations.

This Disclosure includes a methodology that simplifies rule tuning for alarm alert parameters that can comprise a process alarm threshold and/or an alarm time delay to make the deployment of a condition monitoring solution faster. Disclosed embodiments recognize in a typical condition monitoring system, sensor measurements are used to calculate features and\or residuals that are then evaluated against a process alarm threshold to decide if an anomalous condition is detected, in which case an alert is generated. To avoid alert chattering, the alerts are typically only generated after a sensed parameter threshold exceeds a minimum period of time reflected in an alarm ON-delay time. Process alarm thresholds and alarm time delays are typically selected manually.

The tuning of alarm parameters is generally performed such that the alarm is sufficiently sensitive to notify the operator of situations of consequence, but not overly sensitive to the point where it creates excessive alarm floods, standing alarms, chattering (or fleeting) alarms. Conventional alarm tuning is performed with reference to a set of historical alarm data, and as such can only reduce chattering alarms. Disclosed aspects recognize alarm tuning techniques should also include historical process sensor data to avoid or treat problems of standing alarms or silent alarms being alarms that have never activated, even during situations of consequence. A recognized disadvantage of known "brute-force" alarm alert parameter setting approaches that utilize iterative trial-and-error calculations is that they are time consuming.

In it recognized in order to make condition monitoring economically viable, the alarm alert parameter setting implementation process should be fast. An advantage of the disclosed methods over traditional alarm rule tuning is that it does not rely on time-consuming iterative trial-and-error calculations. The disclosed alarm alert parameter setting methodology thus reduces the time that engineers and\or technicians spend alarm rule tuning, enabling faster deployment of condition monitoring solutions.

Disclosed aspects are distinct from known alarm tuning by utilizing historical alarm event data in addition to process data, and the data processing involved is slightly more involved. The alarm tuning tool creates two histograms, one from the process data (a process data histogram; see FIG. 3A described below) and one from the alarm event data (an alarm data histogram, see FIG. 3B described below). The alarm tuning tool permits the user to change a threshold for the alarm (alarm threshold or a time delay) superimposed on the process data histogram including by optionally creating another display referred to herein as a hybrid display comprising a time series plot including alarm event data and historical process data by computing the distribution of alarms that would have occurred over the data history period with the new alarm tuning values. This enables fine tuning the threshold and time delays. This hybrid display can include highlighting "close calls". However, alarm tuning can be implemented by only using the histograms. Disclosed alarm tuning can manipulate both alarm threshold(s) and time delay(s), can increase or decrease time delays, and can treat standing or silent alarms. Being above to decrease the time delay is believed to be a new feature.

FIG. 1 shows blocks corresponding to steps for implementing condition monitoring for an industrial process run in an IPF, including a disclosed tune and validate block 140. Sensor data also called process data or PV data is acquired from sensors coupled to processing equipment in an IPF 105 that is stored in a database 108, such as in a conventional data historian. Alarm and Event Data (A&E data) is either separately stored in the data historian, or is stored in an event tracker. This sensor data together with A&E data is accessed, which is then copied to a local storage device shown as 109 upon which historical process data is collected in block 110 over a period of interest, such as over the last 2 years.

Block 120 comprises performing an exploratory analysis using the historical data. Exploratory analysis has the goal of understanding the data and what relationships may exist, prior to performing more advanced modeling work. Exploratory analysis may include visual inspections of the raw data, plots of variables against one another, separation of the data into modes. For example equipment may operate in a variety of models such as startup/shutdown/idle/normal, and each mode may involve separate consideration in the rule design or tuning stages. Block 130 shown as "design rule" comprises designing an initial alarm rule. The initial rule can be generated by a process expert called a subject matter expert (SME) using a combination of experience and by trial-and-error, or with some degree of automation.

Block 140 comprise tuning and validating the rule which is described in detail in FIG. 2 disclosed below. Disclosed aspects provide a new methodology for tuning and validating a rule comprising alarm tuning by adjusting at least one alarm threshold and/or time delay while simulating after the adjusting a performance of the alarm over the historical process data to generate new tuning values. The simulating is generally over the same time period as the histograms. Block 150 shown as "deploy on line in a plant" comprises on being satisfied with the displayed performance of the rule after the alarm tuning, for example receiving at least 2 and no more than 6 alarms per hour, implementing the rule online by transferring the new alarm tuning values to a control system of the IPF for monitoring a process or processing equipment in the IPF.

Figure 2:
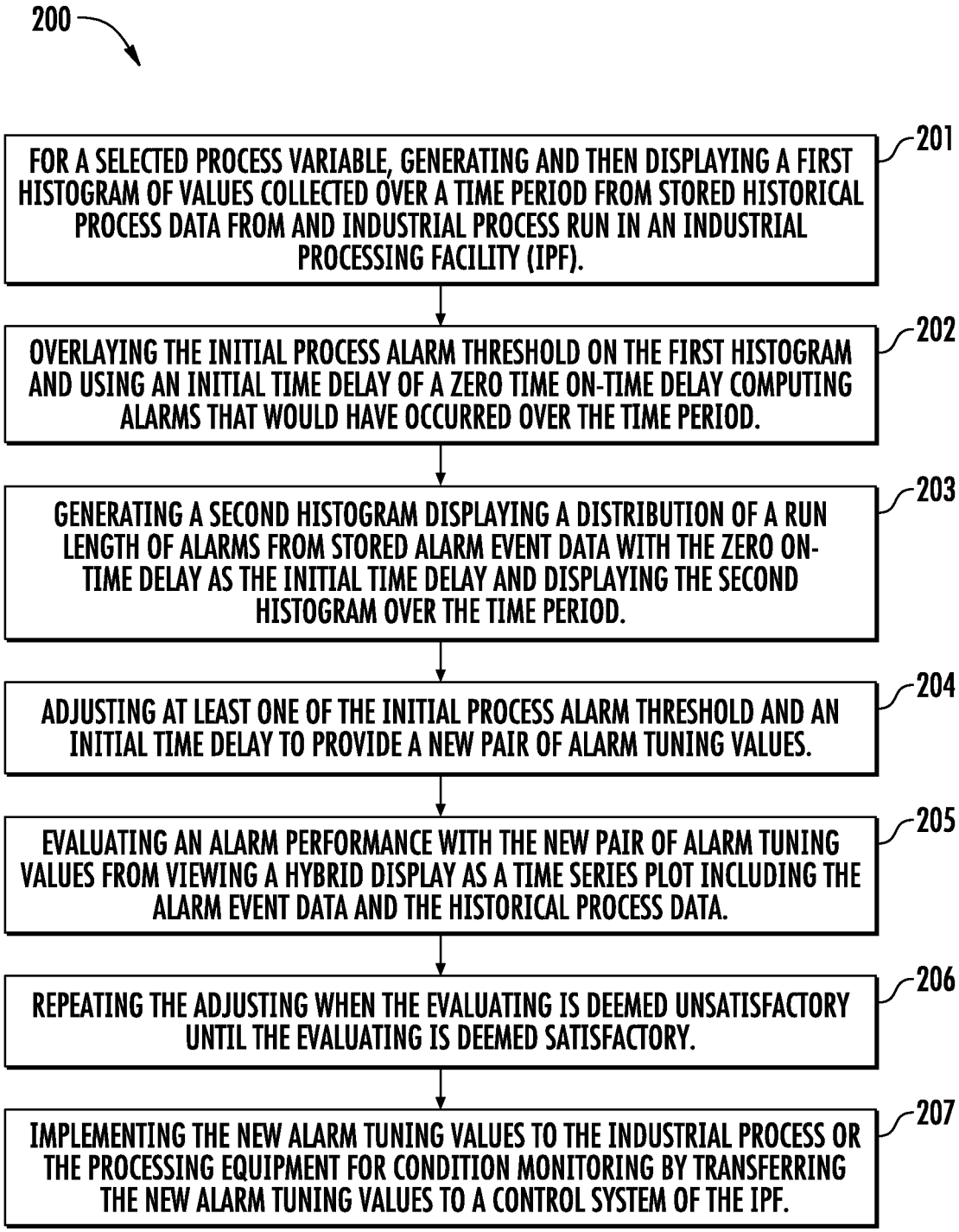
FIG. 2 is a flow chart that shows steps in a method of tuning alarm alert parameters for an industrial process run in an IPF, according to an example embodiment.
Figure 3A:
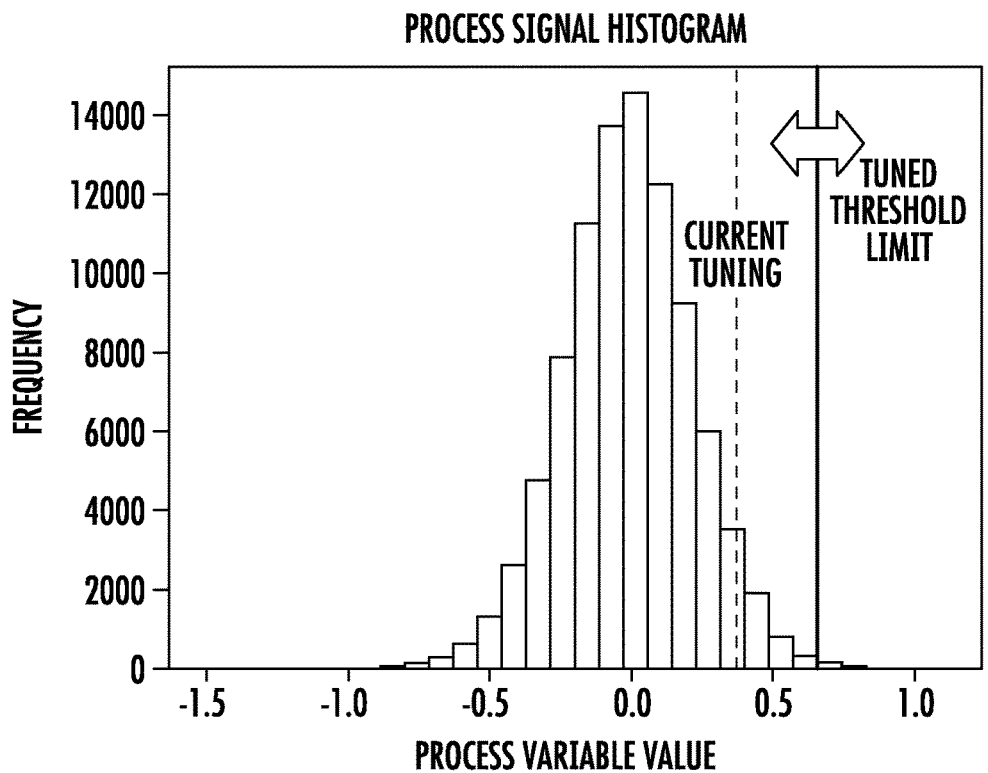
FIG. 3A shows an example process signal histogram.

FIG. 2 is a flow chart that shows steps in a method 200 of tuning alarm alert parameters for condition monitoring of processing equipment configured in IPF to run an industrial process or for monitoring of the industrial process itself. Steps 201-203 comprise alarm initialization. Step 201 comprises for a selected process variable, generating and then displaying a first histogram of values from stored historical process data spanning a time period that is generally obtained from sensor data saved in a data historian. The process variable is generally an actual process variable, such as temperature or a pressure. However, the process variable can comprise a function of one or more process variables, such as a multivariate function, for example a squared prediction error in a data-driven Principal Components Analysis (PCA) model or the residual in a model-based method. FIG. 3A shows an example of a process data histogram that plots the process variable value (on the x-axis) vs. the frequency of occurrence (on the y-axis). Two different threshold limits are shown, shown as a current tuning and a tuned alarm threshold reflecting a user's tuning.

Figure 3B:
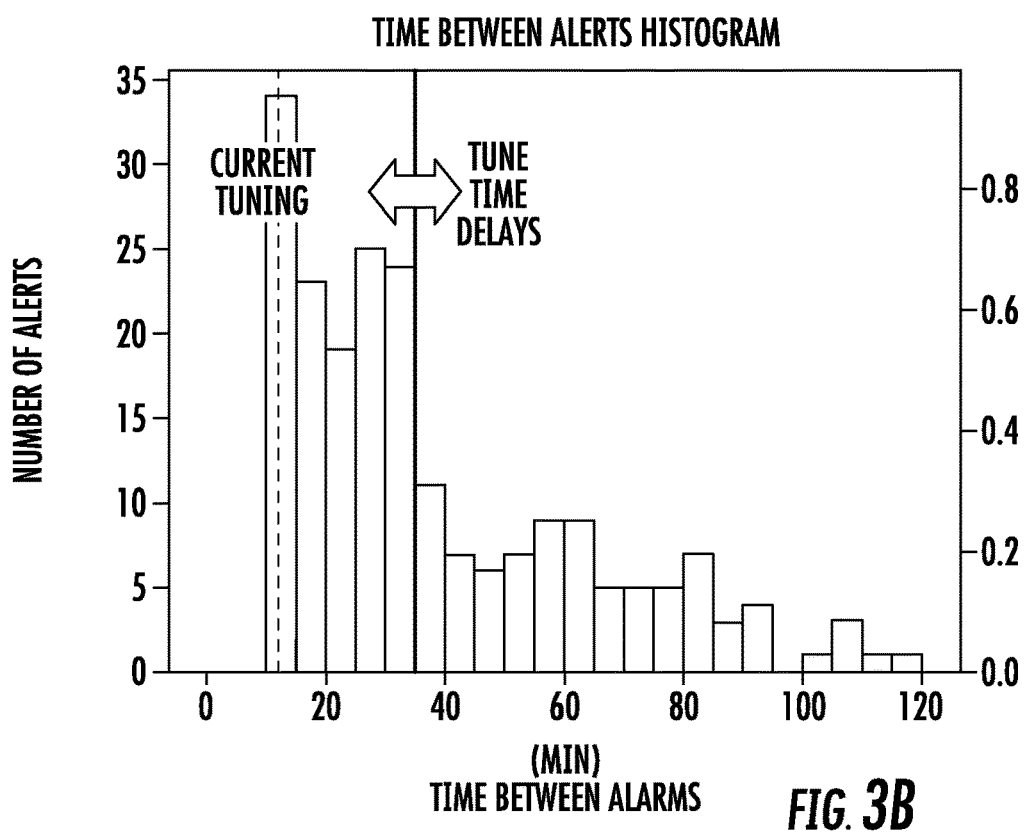
FIG. 3B shows an example time between alarms histogram.

Step 202 comprises overlaying an initial process alarm threshold (e.g., a desired process alarm threshold), such as the tuned alarm threshold shown in FIG. 3A, on the first histogram, then computing alarms that would have occurred over the time period, assuming a zero ON-time delay. Regarding an "ON"-delay time, in this case the alarm state switches from OFF to ON once the process variable (y) has been above its threshold (Yt) for longer than the time delay (Td). An upper limit may be placed on y when y>Yt. An analogous diagram can be used for a case where an alarm was placed on a lower limit of a process variable, such as y when interested in case when y<Yt. The method can further comprise further comprises overlaying a current alarm threshold and current time delay on the first and second histograms, respectively, for comparison with the initial process alarm threshold and the initial time delay. FIGS. 3A and 3B show a comparison of "current value" and the user defined values of threshold and time delays, respectively.

Step 203 comprises generating a second histogram displaying a distribution of a run length (time) of the alarms from stored alarm event data, with the zero ON-time delay as the initial time delay and displaying the second histogram over the time period. The run length can comprise an alarm duration, a time from "ON to OFF", or a time between the start of subsequent alarms a time from "ON to ON", or a time representing the durations of no alarms a time from "OFF to ON" run lengths. FIG. 3B shows an example time between alerts histogram that plots the number of alerts (y-axis) vs. the time between alarms (same as ON to ON time). Two different time delay values are shown, shown as a current tuning and a tuned time delay reflecting a user's tuning.

Figure 5A:
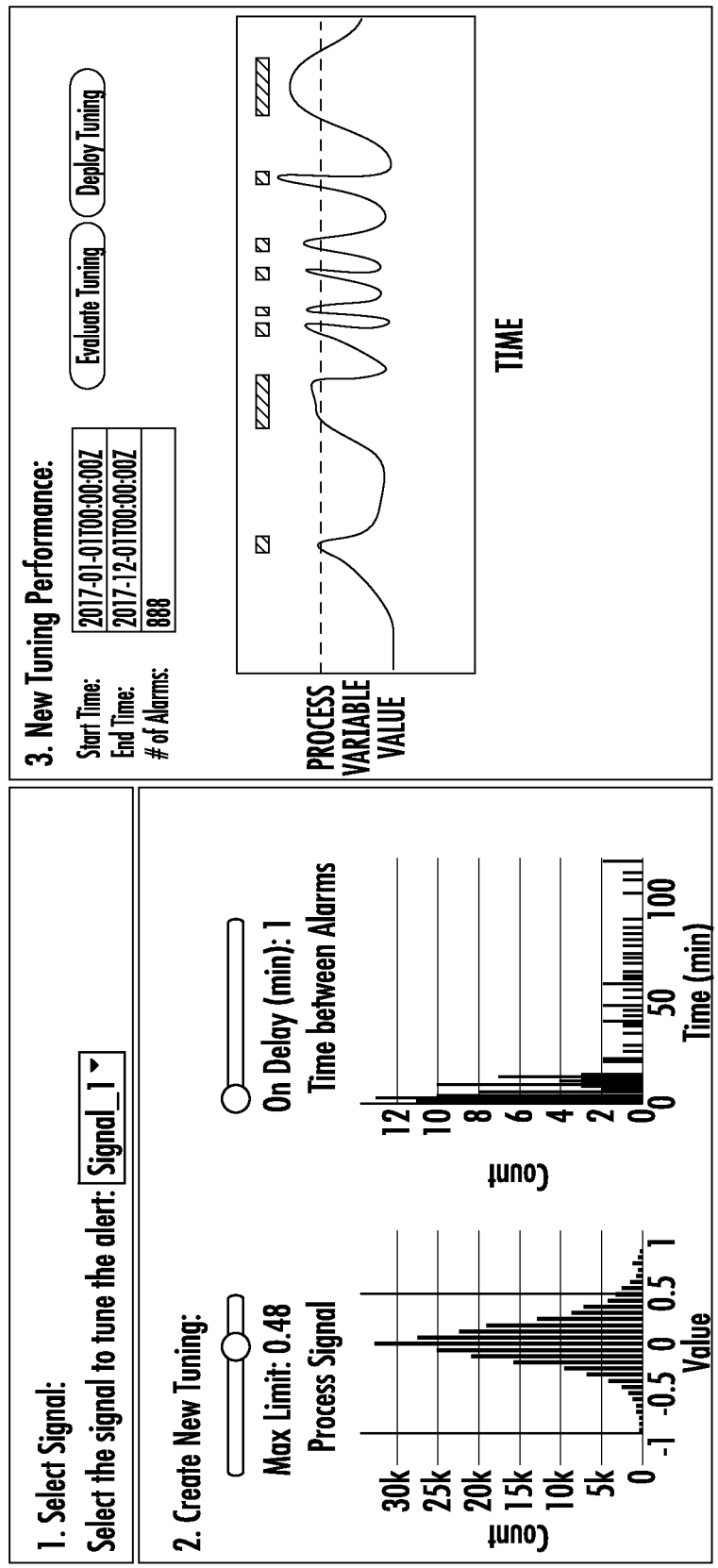
Figure 5B:
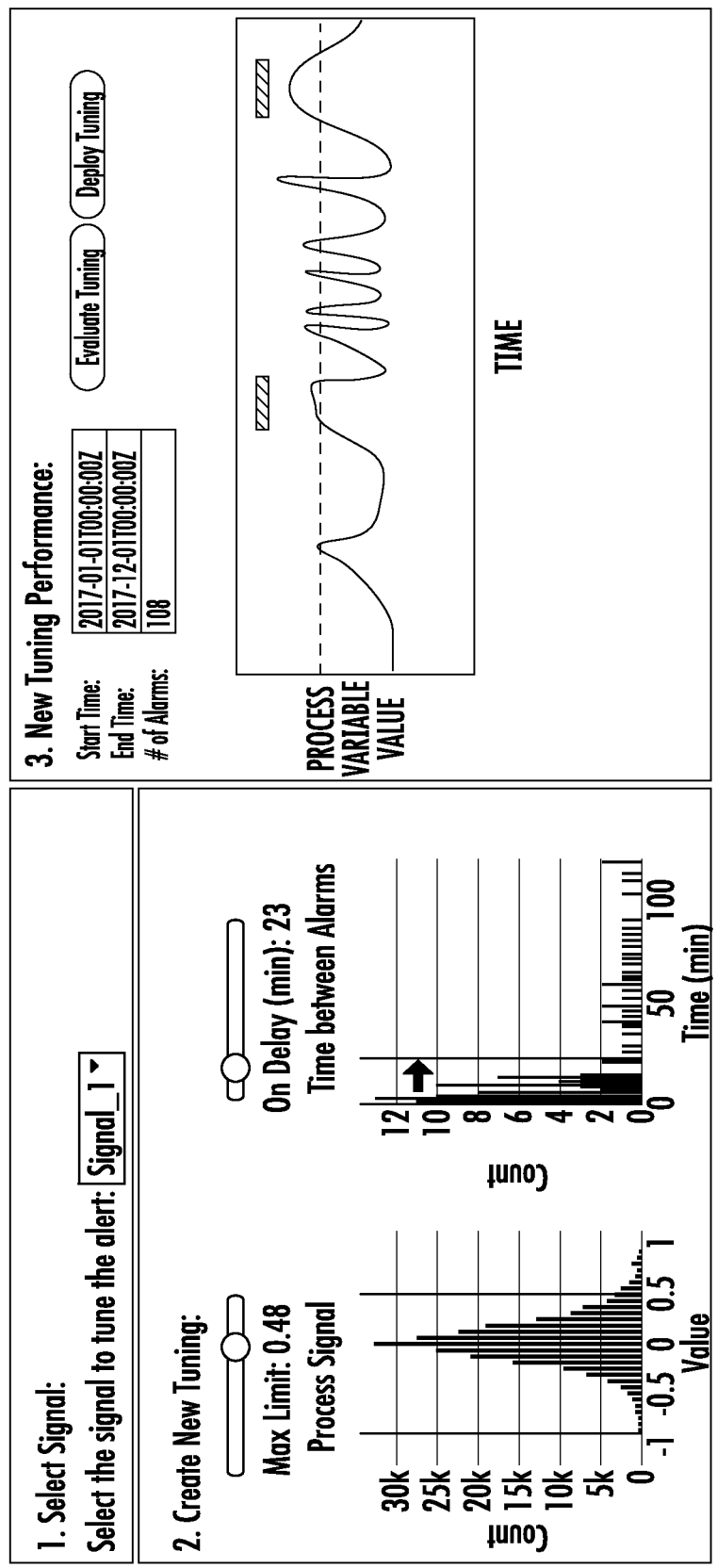
FIG. 5B shows an example disclosed hybrid alarm data and process data display after rule tuning when the alarm time delay is increased to 23 minutes which is shown eliminating shorter duration alarms.

The ON delay time, is generally initially set by the user. This setting enables a user to interpret eliminating the shorter duration alarms (to the left of the desired time delay), while preserving the longer duration alarms (to the right of the desired time delay). FIGS. 5A and 5B illustrate this difference, where the alarm threshold limit is held constant for this example. FIG. 5A illustrates alarm tuning where an ON time delay was initialized to 1 minute. By the appearance of this histogram, one sees there is a large number of short durations between alarms. While in contrast as shown in FIG. 5B, after the user has adjusted the time delay to 23 minutes, any alarm that was shorter than 23 minutes was eliminated, removing much of the alarm chatter. In addition to being able to reduce chatter and fleeting alarms, the disclosed combination of process data with alarm data allows the user to address the case where too few alarms are occurring in the system. Typically correcting for these types of problems will involve either reducing the upper limit Yt or increasing Yt if the alarm is on a lower limit, and/or reducing the Td to catch more alarm events.

Steps 204-207 comprise alarm tuning. Step 204 comprises adjusting at least one of the initial process alarm threshold and an initial time delay to provide a new pair of alarm tuning values. There can be situations where the alarm threshold is needed to stay fixed, for example if the threshold has been set based on safety considerations. In that case the user would more likely adjust only the time delay(s). Step 205 comprises evaluating an alarm performance with the new pair of alarm tuning values from viewing the first and the second histogram, or viewing a hybrid display comprising a time series plot that includes the alarm event data and the historical process data. Alternatively, the alarm tuning can be performed by the user referring to a combination of the first and second histograms along with the hybrid display's time series plot.

Figure 3C:
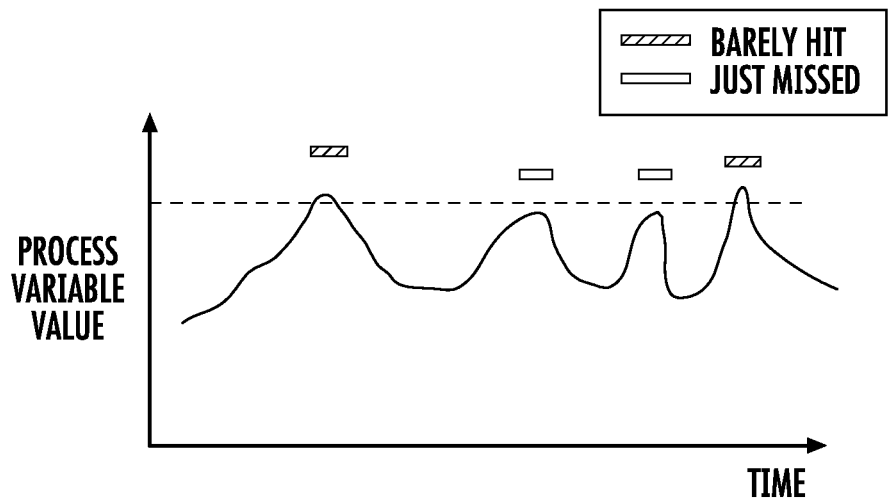
FIG. 3C shows an example disclosed hybrid display including alarm data and process data displayed with a current rule being implemented.

The time series plot of the hybrid display can include an indicator showing close calls based on a user defined or predetermined distance to the alarm threshold to indicate data points where the alarm would have just barely turned ON, or would have just missed turning ON, such as shown in FIG. 3C shown a form that highlights the alerts (where the values are at or above the current or revised process alarm threshold) and near-alerts where the values are approaching the current or revised process alarm threshold. The hybrid display is typically displayed over a much smaller time period compared to the histograms. The histograms and simulations typically involve months to years of historical data, while the time series hybrid display generally will display hours to days of data at any one time to be digestible by a human user.

Step 206 comprises repeating the adjusting when the evaluating is unsatisfactory until the evaluating becomes satisfactory. Step 207 comprises implementing the new alarm tuning values to the industrial process or the processing equipment for condition monitoring by transferring the new alarm tuning values to a control system of the IPF.

FIG. 3C shows an example disclosed hybrid display including alarm data and process data displayed with a current rule being implemented. This display is a more intuitive representation of the information shown in FIGS. 3A and 3B. Typically a user will use the histograms shown in FIGS. 3A-B to perform the coarse tuning of the alarm, for removing chattering, or fixing silent or otherwise underperforming alarms. Once the coarse tuning is complete, then the user may want to look at the time series plot in FIG. 3C to inspect a sampling of cases by selecting a time period of interest, often including at least one in which known issues occurred in the data that the user is familiar with. The user will then judge whether they agree with the behavior of the alarm, possibly fine tuning a threshold or a delay value and then re-simulating to obtain an improved alarm behavior. The alarm tuning is generally continued until a user is satisfied with the performance of the alarm tuning displayed to the user. Step 208 comprises implementing the new alarm tuning value to the industrial process or the processing equipment for condition monitoring by transferring the new alarm tuning value(s) to a control system of the IPF, where the transfer can be automatic or manual. For example, changing a setting with regard to processing equipment in the IPF, such as to the fuel flow to a burner.

Figure 4:
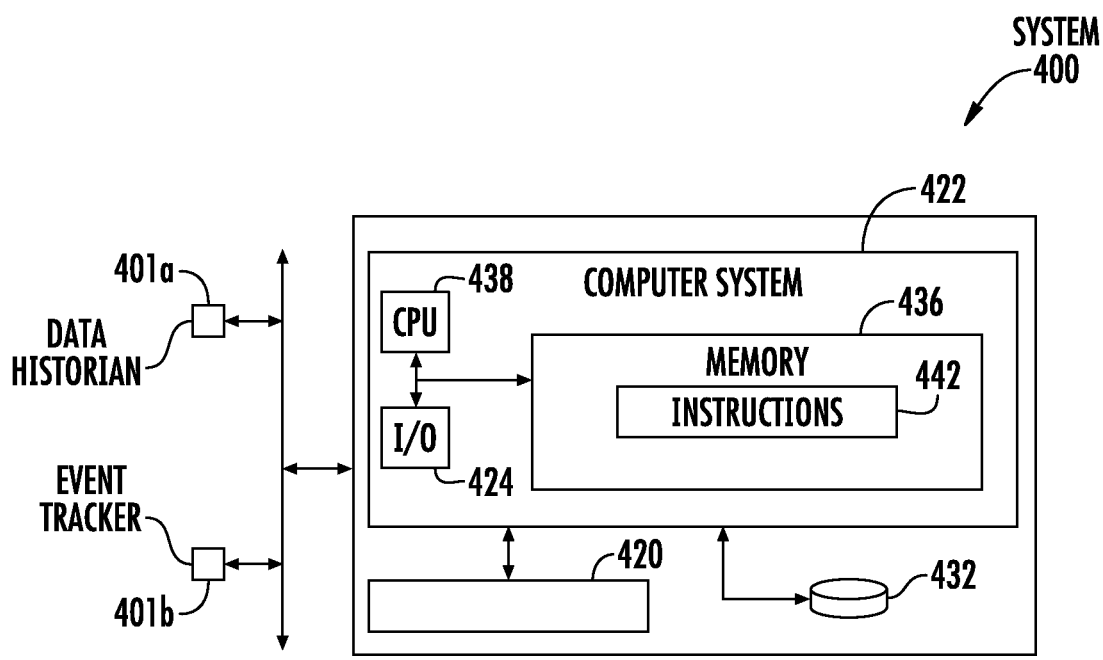
FIG. 4 is a block diagram representation of a computer-based condition monitoring system that can be used to implement disclosed methods of tuning alarm alert parameters.

FIG. 4 is a block diagram representation of a condition monitoring system 400 that can implement disclosed alarm tuning methods. A computer system 422 which includes any programmable device is in communication 420 with a data repository comprising a data historian 401a and an event tracker 401b. The computer system 422 include instructions 442 that provides computer support for disclosed methods, including receiving user entered alarm parameters, simulations and display driving including to generate histograms and optional hybrid displays that generally reside within computer readable code in a computer readable memory 436, or in a computer readable storage system 432, or other tangible computer readable storage medium that is accessed by a Central Processing Unit (CPU) 438 of the computer system 422. An input/output (IO) module 424 is shown coupled to the CPU 438.

Disclosed embodiments can be applied to generally any industrial process control system. For example, for oil refining, pulp and paper manufacturing, chemical processing and for power generating plants.

EXAMPLES

Disclosed embodiments are further illustrated by the following specific Examples, which should not be construed as limiting the scope or content of this Disclosure in any way.

FIG. 5A shows an example of a disclosed hybrid alarm data and process data display when the alarm time delay is initially set to a minimum value shown as 1 minute. Analogous to FIGS. 3A and 3B, the displays shown to the left of FIG. 5A are previous screens to the hybrid time series plot shown displayed to the right in FIG. 5A which shows 8 alarm events indications illustrated and 6 of them are of short duration. The previous screens are histograms that include a process data histogram which plots the process variable value (x-axis) vs. the frequency of occurrence shown as a 'count' with a lower and an upper threshold limit shown by vertical lines (analogous to FIG. 3A), and a time between alarms histogram which plots the time between alarms (x-axis) vs the frequency of occurrence (or number of alerts) shown as a 'count' (analogous to FIG. 3B) where the time between alarms for the alarm time delay is set to 1 minute.

FIG. 5B shows an example disclosed hybrid alarm data and process data display after rule tuning when the alarm time delay (shows as an On-delay time) is increased from 1 minute to 23 minutes. It can be seen from either of the process data histogram or time between alarms histogram, or from the hybrid time series plot on the right of the display that the number of shorter duration alarms (chatter) are reduced from 8 alarm event indications shown in the FIG. 5A hybrid time series plot to 2 alarm event indications in the FIG. 5B hybrid time series plot by eliminating 6 of the relatively short alarms for this alarm tuning.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A method of tuning alarm parameters for condition monitoring of processing equipment configured in an industrial processing facility (IPF) to run an industrial process or for monitoring of the industrial process itself, comprising:
   initializing, comprising:
      for a selected process variable, generating and then displaying a first histogram of values over a time period from stored historical process data;
      overlaying an initial process alarm threshold on the first histogram, and using an initial time delay of a zero ON-time delay computing alarms that would have occurred over the time period;
      generating a second histogram displaying a distribution of a run length of alarms from stored alarm event data with the zero ON-time delay as the initial time delay and displaying the second histogram over the time period,
   alarm tuning, comprising:
      adjusting at least one of the initial process alarm threshold and said initial time delay to provide a new pair of alarm tuning values;
      evaluating an alarm performance with the new pair of alarm tuning values from viewing the first histogram and the second histogram or viewing a hybrid display comprising a time series plot including said alarm event data and said historical process data;
      repeating said adjusting when said evaluating is deemed unsatisfactory until said evaluating is deemed satisfactory, and
      implementing the new alarm tuning values to the industrial process or the processing equipment for said condition monitoring by transferring said new alarm tuning values to a control system of said IPF.

2. The method of claim 1, wherein said initializing further comprises:
   simulating an alarm performance for said selected process variable over said historical process data spanning a simulation time period using said initial process alarm threshold, and
   displaying results of said simulating as said hybrid display.

3. The method of claim 2, wherein said time series plot said of said hybrid display includes an indicator showing close calls based on a user defined or predetermined distance to said alarm threshold to indicate data points where the alarm would have just barely turned ON, or would have just missed turning ON.

4. The method of claim 1, wherein said evaluating comprises viewing said hybrid display.

5. The method of claim 1, wherein said evaluating results in said method returning to said alarm tuning including updating said alarm threshold or said time delay to provide updated alarm tuning values.

6. The method of claim 1, wherein said run length of said alarms comprise an alarm duration "ON to OFF", a time between the start of subsequent alarms a time from "ON to ON", or a time representing durations of no alarms, or a time from "OFF to ON" run lengths.

7. The method of claim 1, further comprising overlaying current ones of said alarm threshold and said time delay on the first and second histograms, respectively, for comparison with said initial process alarm threshold and said initial time delay.

8. The method of claim 1, wherein said new alarm tuning values includes a revised said alarm threshold and a revised said time delay.

9. The method of claim 1, wherein said alarm tuning provides a revised said time delay, and said revised time delay is decreased relative to a current said time delay.

10. The method of claim 1, wherein said process alarm threshold comprises a maximum process alarm threshold and a minimum process alarm threshold.

11. The method of claim 1, wherein a slider bar is provided on a display device used for said adjusting.

12. A condition monitoring system, comprising:
a computer system including an associated memory in communication with a data repository comprising a data historian having stored historical process data spanning a time period and an event tracker having stored alarm event data over said time period;
wherein the computer system include an associated memory that has instructions for implementing a method of tuning alarm alert parameters for condition monitoring of processing equipment configured in an industrial processing facility (IPF) to run an industrial process or for monitoring of the industrial process itself, said method comprising:
initializing, comprising:
for a selected process variable, generating and then displaying a first histogram of values over a time period from said historical process data;
overlaying an initial process alarm threshold on the first histogram, and using an initial time delay of a zero ON-time delay computing alarms that would have occurred over the time period;
generating a second histogram displaying a distribution of a run length of alarms from stored alarm event data with the zero ON-time delay as the initial time delay and displaying the second histogram over the time period,
alarm tuning, comprising:
adjusting at least one of the initial process alarm threshold and said initial time delay to provide a new pair of alarm tuning values;
evaluating an alarm performance with the new pair of alarm tuning values from viewing the first histogram and the second histogram or a hybrid display comprising a time series plot including said alarm event data and said historical process data;
repeating said adjusting when said evaluating is deemed unsatisfactory until said evaluating is deemed satisfactory, and
implementing the new alarm tuning values to the industrial process or the processing equipment for said condition monitoring by transferring said new alarm tuning values to a control system of said IPF.

13. The condition monitoring system of claim 12, wherein said initializing further comprises:
simulating an alarm performance for said selected process variable over said historical process data spanning a simulation time period using said initial process alarm threshold, and
displaying results of said simulating as said hybrid display.

14. The condition monitoring system of claim 13, wherein said time series plot said of said hybrid display—includes an indicator showing close calls based on a user defined or predetermined distance to said alarm threshold to indicate data points where the alarm would have just barely turned ON, or would have just missed turning ON.

15. The condition monitoring system of claim 12, wherein said evaluating results in said method returning to said alarm tuning including updating said alarm threshold or said time delay to provide updated alarm tuning values.

16. The condition monitoring system of claim 12, wherein said run length of said alarms comprise an alarm duration "ON to OFF", a time between the start of subsequent alarms a time from "ON to ON", or a time representing durations of no alarms, or a time from "OFF to ON" run lengths.

17. The condition monitoring system of claim 12, further comprising overlaying current ones of said alarm threshold and said time delay on the first and second histograms, respectively, for comparison with said initial process alarm threshold and said initial time delay.

18. The condition monitoring system of claim 12, wherein said new alarm tuning values includes a revised said alarm threshold and a revised said time delay.

19. The condition monitoring system of claim 12, wherein said alarm tuning provides a revised said time delay, and said revised time delay is decreased relative to a current said time delay.

20. The condition monitoring system of claim 12, wherein said process alarm threshold comprises a maximum process alarm threshold and a minimum process alarm threshold.

* * * * *